US009487089B2

(12) United States Patent
Reichow et al.

(10) Patent No.: US 9,487,089 B2
(45) Date of Patent: Nov. 8, 2016

(54) ON-BOARD SYSTEM FOR A VEHICLE AND DEVICE FOR CONTROLLING A CURRENT FLOW IN AN ON-BOARD SYSTEM OF A VEHICLE

(75) Inventors: Dirk Reichow, Wenzenbach (DE); Tobias Steckermeier, Pettendorf (DE); Tobias Galli, Roding (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 714 days.

(21) Appl. No.: 13/996,398

(22) PCT Filed: Dec. 12, 2011

(86) PCT No.: PCT/EP2011/072414
§ 371 (c)(1),
(2), (4) Date: Jul. 31, 2013

(87) PCT Pub. No.: WO2012/084565
PCT Pub. Date: Jun. 28, 2012

(65) Prior Publication Data
US 2013/0300193 A1    Nov. 14, 2013

(30) Foreign Application Priority Data

Dec. 20, 2010    (DE) .................. 10 2010 063 598

(51) Int. Cl.
*B60L 1/00*    (2006.01)
*B60R 16/03*    (2006.01)
*F02N 11/08*    (2006.01)
*F02N 11/10*    (2006.01)

(52) U.S. Cl.
CPC ................ *B60L 1/00* (2013.01); *B60R 16/03* (2013.01); *F02N 11/0866* (2013.01); *F02N 11/087* (2013.01); *F02N 11/108* (2013.01)

(58) Field of Classification Search
CPC ....... B60R 16/03; F02N 11/0866; B60L 1/00
USPC .......................................................... 307/9.1
See application file for complete search history.

(56) References Cited

U.S. PATENT DOCUMENTS 7,436,080 B2 * 10/2008 Hackl ................... H02J 7/1423
                                                                290/40 C
7,506,182 B2 *  3/2009 Taniguchi ................. B60L 7/10
                                                                307/10.6

FOREIGN PATENT DOCUMENTS

| DE | 10305357 A1    | 8/2004 | ................ H02J 7/14  |
| DE | 102005039362 A1 | 3/2006 | ............. B60R 16/02 |
| DE | 102006037699 A1 | 2/2008 | ........... B60R 16/033 |
| EP |   2154359 A1   | 2/2010 | ............. F02N 11/08 |
| WO | 2012/084565 A1 | 6/2012 | ............. B60R 16/03 |

OTHER PUBLICATIONS

International Search Report and Written Opinion, Application No. PCT/EP2011/072414, 21 pages, Mar. 16, 2012.

* cited by examiner

*Primary Examiner* — Jared Fureman
*Assistant Examiner* — Duc M Pham
(74) *Attorney, Agent, or Firm* — Slayden Grubert Beard PLLC (57) ABSTRACT

An on-board system for a vehicle and a device for controlling a current flow in an on-board system of a vehicle, as well as a vehicle (e.g., a motor vehicle) including such on-board system or device, are disclosed. The on-board system or device may include a control device and an emergency power source for closing a self-locking switch controlling the current flow in the on-board system in order to prevent a possible parasitic current injection when a faulty voltage drop occurs, and to thus prevent system overheating.

14 Claims, 5 Drawing Sheets

ON-BOARD SYSTEM FOR A VEHICLE AND DEVICE FOR CONTROLLING A CURRENT FLOW IN AN ON-BOARD SYSTEM OF A VEHICLE

CROSS-REFERENCE TO RELATED APPLICATIONS

This application is a U.S. National Stage Application of International Application No. PCT/EP2011/072414 filed Dec. 12, 2011, which designates the United States of America, and claims priority to DE Application No. 10 2010 063 598.7 filed Dec. 20, 2010, the contents of which are hereby incorporated by reference in their entirety.

TECHNICAL FIELD

This disclosure relates to an on-board system for a vehicle and to a device for controlling a current flow in an on-board system of a vehicle according to the preamble of the independent claims. The disclosure also relates to a vehicle, for example a motor vehicle, comprising an above-mentioned on-board system or an above-mentioned device.

BACKGROUND

On-board systems of current motor vehicles comprise a generator formed as a three-phase generator with downstream rectifier circuit as an energy convertor, one or more energy storage units, for example batteries, and also electrical consumers to be supplied via the on-board system, said consumers being referred to together as system load. The three-phase generator, one or more energy storage units, and also the electrical consumers are referred to together as a first energy system.

The on-board systems also comprise further energy storage units, such as double-layer capacitors, which together are referred to as a second energy system.

The two energy systems have different nominal voltages as system voltages and are isolated from one another, but are also non-isolated.

The first energy system, for example with one or more 12 V batteries as an energy store, is used as an energy or power source for the normal consumers of the motor vehicle, such as lights.

The second energy system, for example comprising double-layer capacitors (ultracaps), is used as an energy or power source for the high-current consumers, such as motor starters.

The current flow between these two energy systems is controlled by a device, wherein this device is supplied with an operating voltage by an energy store, that is to say power source, of one of the two energy systems (generally by the 12 V battery of the first energy system).

In an on-board system, it is very important to achieve a largely safe system state (safe-state) in a nominal operating condition of the on-board supply, but also in a non-nominal operating condition of the on-board supply.

One of the requirements when observing a safe system state in the event of the occurrence of a system fault in the on-board system, in particular in the first energy system, which leads to a drastic voltage drop in the first and/or in the second energy system, is to hold closed the electrically closed current path in the first energy system in order to avoid an undesired parasitic current injection from the first energy system to the second energy system, which (the undesired parasitic current injection) leads to an uncontrolled overcharging of the energy store of the second energy system and also to overheating of the electronic components located in the current path from the first energy system to the second energy system.

SUMMARY

One embodiment provides an on-board system for a vehicle, comprising the following features: a first current path, comprising at least one current consumer, a first energy store, and a first self-locking switch controllable by means of a first control voltage, wherein, in a closed state of the first switch, the at least one current consumer is electrically connectable to the first energy store; a second current path, comprising the at least one current consumer, the first and a second energy store, and a second switch controllable by means of a second control voltage, wherein, in a closed state of the second switch, the at least one current consumer is electrically connectable to the first and the second energy store; and a control arrangement for closing the first switch or for holding the first switch in the closed state when the voltage provided by the energy store supplying the first switch falls below a minimum voltage threshold value necessary to close the first switch or to hold the first switch in the closed state.

In a further embodiment, the on-board system comprises an emergency power source for providing the voltage necessary to close the first switch or to hold the first switch in the closed state, wherein the control arrangement closes the first switch or holds the first switch in the closed state by means of the voltage provided by the emergency power source.

In a further embodiment, the first energy store and the second energy store are then only electrically connected at the same time to the current consumer when the first switch is located in the open state and the second switch is simultaneously located in the closed state.

In a further embodiment, the control arrangement then closes the first switch or holds the first switch in the closed state by means of the voltage provided by the emergency power source only when the second switch is located in the open state.

In a further embodiment, the control arrangement closes the first switch or holds the first switch in the closed state selectively by means of the voltage of the emergency power source or by means of the voltage of the first energy store or of the second energy store and in a manner dependent on the voltage of the emergency power source and dependent on at least one of the voltages of the first energy store and of the second energy store.

In a further embodiment, the first switch comprises a control connection for the control voltage; and the control arrangement comprises a first electric valve, in particular a diode, arranged between the control connection of the first switch and the emergency power source, and conductive towards the control connection of the first switch and in the opposite direction blocking, and/or a second electric valve, in particular a diode, arranged between the control connection of the first switch and the first energy store, and conductive towards the control connection of the first switch and in the opposite direction blocking, and/or a third electric valve, in particular a diode, arranged between the control connection, of the first switch and the second energy store, and conductive towards the control connection of the first switch and in the opposite direction blocking.

In a further embodiment, the emergency power source is a rechargeable accumulator, and the on-board system comprises, between the first energy store and/or second energy store and the emergency power source, a first recharging unit and/or second recharging unit for charging the emergency power source with the power of the first energy store and/or of the second energy store.

In a further embodiment, the control arrangement comprises a third controllable switch between the control connection of the first switch and the ground potential, and a control unit for controlling the third switch, wherein said control unit determines an effective current value at the current path from the first energy store to the current consumer, in particular at the first energy store, compares the effectively determined current value with a predefined target current value, and, if the target current value is exceeded by the effectively determined current value, closes the third switch and thus connects the control voltage of the first switch to ground potential.

Another embodiment provides a device for controlling a current flow in an on-board system, said device comprising the following features: a first electrical connection, a second electrical connection and a third electrical connection, a first self-locking switch arranged between the first and the second connection and controllable by means of a first control voltage applied to a fourth connection of the device, wherein, in a closed state of the first switch, the first connection is electrically connectable to the second connection, a second switch arranged between the first and the third connection and controllable by means of a second control voltage, wherein, in a closed state of the second switch, the first connection is electrically connectable to the third connection, and a control arrangement for closing the first switch or for holding the first switch in the closed state when the control voltage applied to the fourth connection of the device falls below a minimum voltage threshold value necessary to close the first switch or to hold the first switch in the closed state, wherein the first switch, in the closed state controlled by the control arrangement, electrically connects, in particular electrically short circuits, the first connection to the second connection and thus prevents a potential parasitic current flow from the first connection via the open second switch to the third connection.

In a further embodiment, the device comprises an emergency power source for providing the voltage necessary for closing the first switch or for holding the first switch in the closed state, wherein the control arrangement closes the first switch or holds the first switch in the closed state by means of the voltage provided by the emergency power source.

In a further embodiment, the control arrangement closes the first switch or holds the first switch in the closed state selectively by means of the voltage of the emergency power source or by means of the control voltage applied to the fourth connection or to the third connection of the device, in a manner dependent on the voltage of the emergency power source and dependent on the control voltage applied to the fourth connection or to the third connection of the device.

In a further embodiment, the first switch comprises a control connection for the control voltage, and the control arrangement comprises a first electric valve, in particular a diode, arranged between the control connection of the first switch and the emergency power source, and conductive towards the control connection of the first switch and in the opposite direction blocking, and/or a second electric valve, in particular a diode, arranged between the control connection of the first switch and the fourth connection, and conductive towards the control connection of the first switch and in the opposite direction blocking, and/or a third electric valve, in particular a diode, arranged between the control connection of the first switch and the third connection, and conductive towards the control connection of the first switch and in the opposite direction blocking.

In a further embodiment, the emergency power source is a rechargeable accumulator, and the device, between the fourth connection and/or third connection and the emergency power source, comprises a first recharging unit and/or second recharging unit for charging the emergency power source with the power applied to the fourth connection and/or third connection.

In a further embodiment, the control arrangement comprises a third controllable switch between the control connection of the first switch and the ground potential, and a control unit for controlling the third switch, wherein said control unit determines an effective current value at the current path from the first connection to the second connection, compares the effectively determined current value with a predefined target current value, and, if the target current value is exceeded by the effectively determined current value, closes the third switch and thus connects the control voltage of the first switch to ground potential.

Another embodiment provides a vehicle, e.g., a motor vehicle, comprising any of the on-board systems and/or devices disclosed above.

BRIEF DESCRIPTION OF THE DRAWINGS

Example embodiments are discussed below with reference to the drawings, in which.

DETAILED DESCRIPTION

Embodiments of the present invention may improve the on-board system mentioned in the introduction or the device mentioned in the introduction for controlling the current flow in an on-board system such that the above-mentioned disadvantages are avoided.

In invention first embodiment, an on-board system is created, which comprises a first and a second current path. The first current path comprises at least one current consumer, a first energy store, and a first self-locking switch controllable by means of a first control voltage, wherein, in a closed state of the first switch, the current consumer is electrically connectable to the first energy store and, in an open state of the first switch, is electrically separable from the energy store.

The first switch is therefore used, in the closed state, to produce a current flow in the first energy system or from the first energy store to the current consumers in the on-board system, and, in the open state, to prevent said current flow.

The term "self-locking switch" means that the switch closes or is held in the closed state when a control voltage having a sufficiently high voltage level is applied to the control connection of the switch and thus enables a current flow between the two switch connections; and, when there is no control voltage or when the control voltage drops below the minimum voltage level necessary to hold the switch in the closed state, automatically opens and interrupts the current flow.

The first switch may comprise a control connection, to which the control voltage for closing and opening the first switch is applied.

The second current path comprises at least the one abovementioned current consumer, the first and a second energy store, and also a second switch controllable by means of a second control voltage, wherein, in a closed state of the second switch, the current consumer is electrically connectable to the first and the second energy store and, in an open state of the second switch, is electrically separable from the first and the second energy store.

The second switch is therefore used, in the closed state, to produce a current flow from the second energy system to the first energy system or from the second energy store in the second energy system to the at least one current consumer in the on-board system, and, in the open state, to prevent said current flow.

The current flow between these two energy systems or in the two energy systems is therefore controlled by these two switches, wherein the first switch controls the current flow in the first current path in the first energy system or from the first energy store to the at least one current consumer in the on-board system, and the second switch controls the current flow in the second current path from the second energy system to the first energy system or from the second energy store to the current consumers.

In a nominal, fault-free system state in the on-board system, the current consumers in the on-board system are supplied with power from the generator and the first energy store of the first energy system. In this nominal state, the generator and the first energy store can largely maintain a stable on-board-system voltage.

In this state, the system voltage of the first energy system lies above a minimum nominal voltage necessary to supply the system load. In this nominal, fault-free system state, the first switch is closed and produces a current flow in the first current path. The second switch by contrast is opened (or open) and thus prevents a current flow from the second energy system to the first energy system or from the second energy store to the current consumer or to the first energy store.

In a non-nominal yet still fault-free system state in the on-board system, wherein the power consumption of the system load rises sharply for a short time by closing one or more high-current consumer(s), such as motor starters, the generator and the first energy store alone can no longer continue to maintain a stable on-board-system voltage, and there is therefore a risk that the system voltage of the first energy system or the voltage of the on-board system will drop below the nominal voltage. In this non-nominal yet fault-free system state, the first switch is opened and interrupts the current flow in the first current path. By contrast, the second switch is closed and thus connects the second energy system to the first energy system or the second energy store to the first energy store and thus produces a current flow in the second current path from the first energy store to the second energy store as far as the current consumers.

Furthermore, the on-board system comprises a control arrangement for closing the first switch or for holding the first switch in the closed state when the voltage provided by the energy store supplying the first switch with the control voltage falls below a predetermined minimum voltage threshold value necessary to close the first switch or to hold the first switch in the closed state.

To this end, an emergency power source or emergency voltage source is provided for providing the emergency control voltage necessary to close the first switch or to hold the first switch in the closed state.

The control arrangement closes the first switch by means of said emergency voltage provided by the emergency power source when the voltage provided by the energy store falls below the minimum voltage threshold value necessary to close the first switch or to hold the first switch in the closed state.

An on-board system is thus created, which, when a system fault occurs in the on-board system, in particular in the first energy system, which leads to a drastic voltage drop in the first and/or in the second energy system, can still maintain a safe system state by holding closed the electrically closed current path in the first energy system.

The first and second energy store are then advantageously electrically connected at the same time to the current consumers when the first switch is located in the open state and the second switch is simultaneously located in the closed state. An electrical short circuit in the second current path, which leads to a power loss in the second energy system, is thus avoided as a result of the simultaneously closed two switches.

The control arrangement then preferably closes the first switch or holds the first switch in the closed state by means of the emergency voltage provided by the emergency power source only when the second switch is located in the open state. Only the undesired parasitic current injection from the first energy system via the open second switch to the second energy system is thus bypassed to the ground connection by the closed first switch and is made harmless.

A desired current flow through the selectively closed second switch is by contrast not to be dissipated by the first switch.

Here, the control arrangement closes the first switch or holds the first switch in the closed state selectively by means of the voltage of the emergency power source or by means of the voltage of the first or second energy store and in a manner dependent on the voltage of the emergency power source and dependent on at least one of the voltages of the first and of the second energy store.

Here, the control arrangement compares the voltage provided by the emergency power source with at least one of the two voltages provided by the first and/or by the second energy store and closes the first switch and holds the first switch in the closed state by means of the voltage having the greatest voltage value.

In order to compare the voltages provided by the emergency power source, by the first energy store and/or by the second energy store, the control arrangement comprises at least one or three electric valves, which are preferably formed as diodes.

The first electric valve is arranged between the control connection of the first switch and the emergency power source and is designed to be electrically conductive towards the control connection of the first switch and in the opposite direction electrically blocking.

The second electric valve is arranged between the control connection of the first switch and the first energy store and is designed so as to be electrically conductive towards the control connection of the first switch and in the opposite direction electrically blocking.

The third electric valve is arranged between the control connection of the first switch and the second energy store and is likewise designed so as to be electrically conductive towards the control connection of the first switch and in the opposite direction electrically blocking.

A control arrangement is thus created that can be produced in a cost effective and simple manner.

The emergency power source is preferably designed as a rechargeable accumulator. The on-board system comprises, between the first and/or second energy store and the emergency power source, preferably a first and/or second recharging unit for charging the emergency power source with the power of the first and/or of the second energy store. The emergency power source is charged with the power of the first and/or of the second energy store by means of said at least one recharging unit arranged between the first and/or second energy store and the emergency power source.

The emergency power source thus has a very long service life and is therefore low-maintenance.

The control arrangement advantageously comprises a third controllable switch between the control connection of the first switch and the ground potential.

The control arrangement further comprises a control unit of a controller of the third switch, wherein said control unit determines an effective current value at the current path from the first energy store to the current consumer, in particular at the first energy store, compares the effectively determined current value with a predefined target current value, and, if the target current value is exceeded by the effectively determined current value, closes the third switch and thus connects the control voltage of the first switch to ground potential.

It may thus be ensured that the first switch is reliably opened in a non-nominal yet fault-free operating condition in the on-board system so as to reliably electrically connect the second energy system or the second energy store to the first energy system or to the first energy store or the current consumers.

An on-board system for a vehicle is thus created, which, if system faults occur in the on-board system or in an energy store and lead to an interruption of the current flow in the first current path and thus bring the on-board system to a risk situation with an uncontrolled current flow between the first and the second energy system, still comprises the functioning first current path and thus avoids an uncontrolled current flow between the energy systems in the on-board system.

In another embodiment, a device for controlling a current flow in an on-board system is created, said device comprising a first, second and third and also fourth electrical connection, a first self-locking switch arranged between the first and the second connection and controllable by means of a first control voltage (for example provided by a voltage source located outside the device) applied to the fourth connection, and a second switch arranged between the first and the third connection and controllable by a second control voltage (for example likewise provided by a further voltage source located outside the device).

In a closed state, the first switch electrically connects the first connection to the second connection or in an open state electrically separates the first connection from the second connection.

Similarly, the second switch in a closed state electrically connects the first connection to the third connection or in an open state electrically separates the first connection from the third connection.

The device further comprises a control arrangement for closing the first switch or for holding the first switch in the closed state when the control voltage applied to the fourth connection of the device falls below a predetermined minimum voltage threshold value necessary to close the first switch or to hold the first switch in the closed state, wherein the first switch, in the closed state controlled by the control arrangement, electrically connects (or short circuits) the first connection to the second connection and thus prevents a potential parasitic current flow from the first connection via the open second switch to the third connection.

The device advantageously further comprises an emergency power source for providing the control voltage necessary for closing the first switch or for holding the first switch in the closed state, the control arrangement controlling the first switch by means of said control voltage and thus closing the first switch or holding the first switch in the closed state.

Here, the first switch in the closed state controlled by the voltage provided by the emergency power source electrically connects or short circuits the first connection to the second connection and thus prevents a potential parasitic current flow from the first connection via the second open switch to the third connection.

The control arrangement closes the first switch or holds the first switch in the closed state selectively by means of the voltage of the emergency power source or by means of the control voltage applied to the fourth connection of the device, preferably in a manner dependent on the voltage of the emergency power source and dependent on the control voltage applied to the fourth connection of the device.

To this end, the control arrangement preferably comprises:
 a first electric valve arranged between the control connection of the first switch and the emergency power source, and conductive towards the control connection of the first switch and in the opposite direction blocking,
 a second electric valve arranged between the control connection of the first switch and the fourth connection, and conductive towards the control connection of the first switch and in the opposite direction blocking,
 optionally a third electric valve arranged between the control connection of the first switch and the third connection, and conductive towards the control connection of the first switch and in the opposite direction blocking.

The control connection of the first switch is used such that the control voltage is applied to said control connection in order to open and close the switch in a controlled manner.

At least one of the three electric valves is preferably formed as a cost-effective and space-saving diode.

The emergency power source is advantageously designed as a rechargeable accumulator and is charged by a first recharging unit located between the fourth connection and the emergency power source and/or by a second recharging unit arranged between the third connection and the emergency power source with the power (provided by the voltage source located outside the device) applied to the fourth and/or third connection.

In a further preferred embodiment, the control arrangement of the device according to the invention comprises a third controllable switch between the control connection of the first switch and the ground potential.

The control arrangement further comprises a control unit for controlling the third switch, wherein said control unit determines the effective current value at the current path from the first to the second connection, compares the effectively detected current value with a predefined target current value, and, if the target current value is exceeded by the effectively detected current value, closes the third switch and thus connects the control voltage of the first switch to ground potential.

In accordance with a further aspect of the present invention, a vehicle, in particular a motor vehicle, comprising an above-described on-board system or an above-described device is created.

Advantageous embodiments of the above-presented on-board system, in so far as also transferrable to the above-described device or to the above-mentioned vehicle, are also to be considered as advantageous embodiments of the device or of the vehicle.

Example aspects of the invention will be explained in greater detail hereinafter on the basis of two exemplary embodiments with the aid of figures. An on-board system of a hybrid electric vehicle comprising a device according to the invention is used as exemplary embodiments. In the figures, merely the components of an on-board system that are vital for the description of the invention are illustrated. Depending on the embodiment, the on-board system or the device according to the invention may comprise further components, which are not presented in greater detail here however in order to provide a simplified description of the invention.

In accordance with the figures, an on-board system of a motor vehicle comprises a first and a second energy system Esys1, Esys2, and also a device V arranged in the negative current path of the on-board system. The energy systems Esys1, Esys2 in this exemplary on-board system are not isolated from one another, that is to say are non-isolated.

The device V according to the invention can also be arranged however in an on-board system comprising isolated energy systems Esys1, Esys2. The device V can also be arranged not only in the negative current path of the on-board system, but also in the positive path of the on-board system.

The first energy system Esys1 comprises a generator G, an energy store ES1 and a group of current consumers, such as lights or motor starters, which are together referred to as system load LA.

The generator G preferably formed as a three-phase generator with downstream rectifier circuit is used as an energy convertor for converting the kinetic energy from the vehicle into the electrical energy and simultaneously as an energy source for supplying the system load LA with the electrical energy.

The energy store ES1, that is to say the first energy store in the on-board system, stores the electrical energy converted by the generator G and supplies the system load LA with the stored electrical energy.

The second energy system Esys2 of the on-board system comprises a further, that is to say second, energy store ES2 of the on-board system, said second energy store preferably being formed as a double-layer capacitor and likewise being used to supply the system load LA with the stored electrical energy.

The two energy systems Esys1, Esys2 have different nominal voltages Vsys1, Vsys2 as system voltages.

The first energy store ES1 for example comprising one or more 12 V batteries or Li cells in a group circuit is used as an energy or power source for the normal consumers of the system load LA, such as dynamos. The second energy store ES2 is used as an energy or power source for the high-current consumers of the system load LA, such as motor starters.

The current flow between these two energy systems is controlled by a device V or V'.

The device V, V' comprises a first recharging arrangement NL1, by means of which the device V, V' charges the second energy store ES2 with the electrical energy from the first energy store ES1 or the generator G. As required, the device V, V' also charges the first energy store ES1 with the electrical energy from the second energy store ES2. For this purpose, the recharging arrangement NL1 comprises a DC/DC convertor for converting the system voltage Vsys1 of the energy-giving energy system Esys1 into the system voltage Vsys2 of the energy store to be effectively charged Esys2 in order to charge the energy store Esys2 to the desired charging state.

In order to control the current flow from the two energy stores ES1, ES2 to the system load LA, the device V, V' comprises a first and second switch S1, S2, which are controllable independently of one another and which are formed for example as self-locking MOSFETs and are closed/opened in a controlled manner via a gate voltage applied at the respective gate connection GS. The gate voltage of the respective switch S1, S2 is adjusted, and therefore the respective switch S1, S2 is controlled, via a first and a second control arrangement SE1, SE1' or SE2 respectively, which are electrically connected on the output side to the gate connections of the respective switch S1, S2.

By means of the first switch S1, the device V, V' electrically connects or separates the first energy store ES1 of the first energy system Esys1 and the system load LA.

In order to electrically connect the first energy store ES1 to the system load LA, the device V, V' closes the first switch S1. To separate the electrical connection between the first energy store ES1 and the system load LA, the device V, V' opens the first switch S1.

In a nominal system state in the on-board system, the current consumers LA in the on-board system are supplied with power from the generator G and the first energy store ES1 of the first energy system Esys1 by closing the first switch S1. In this nominal state, the generator G and the first energy store ES1 largely maintain a stable voltage in the on-board system.

In a non-nominal system state, wherein the power consumption rises sharply for a short time by closing one or more high-current consumers, such as motor starters, the generator G and the first energy store ES1 can alone no longer continue to maintain a stable voltage in the on-board system.

In this non-nominal state, the second energy system Esys2 has to be closed or fed by means of the second energy store ES2 in the on-board system.

This occurs by intended actuation of both switches S1, S2 of the device V, V'. The device electrically connects or separates the second energy system Esys2 or the second energy store ES2 of the second energy system Esys2 to or from the first energy system Esys1 or the first energy store ES1 and also the system load LA of the first energy system Esys1 by means of the first and second switch S1, S2.

By simultaneously closing the second switch S2 and by opening the first switch S1, the device V, V' electrically connects the second energy system Esys2 or the second energy store ES2 of the second energy system Esys2 to the first energy system Esys1 or the first energy store ES1 and also the system load LA of the first energy system ES1 and thus maintains the voltage in the on-board system.

By opening the second switch S2, the device V separates the second energy system Esys2 or the second energy store ES2 from the first energy system Esys1 or from the first energy store ES1 and also from the system load LA.

Besides the first recharging arrangement NL1 and the two switches S1, S2, the device V, V' further comprises a control arrangement SE1, SE1' for controlling the first switch 1, a rechargeable accumulator as an emergency power source NQ, a second recharging arrangement NL2, NL2' for the emergency power source NQ, and a diagnosis arrangement DN for diagnosing the functionality or for monitoring the charging state of the emergency power source NQ.

Figure 1:
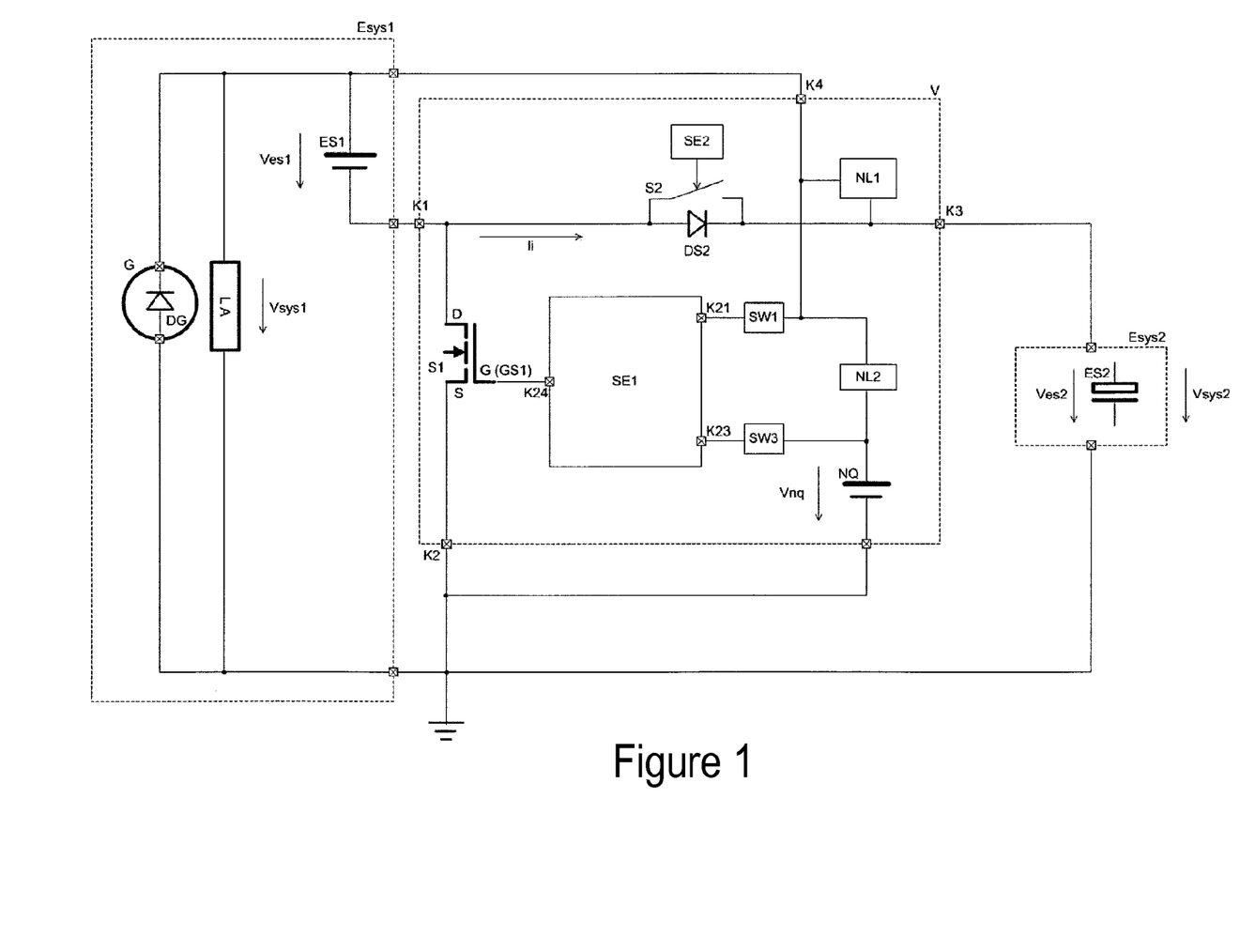
FIG. 1 shows a block diagram of an on-board system of a motor vehicle, comprising a first device according to the invention.
Figure 2:
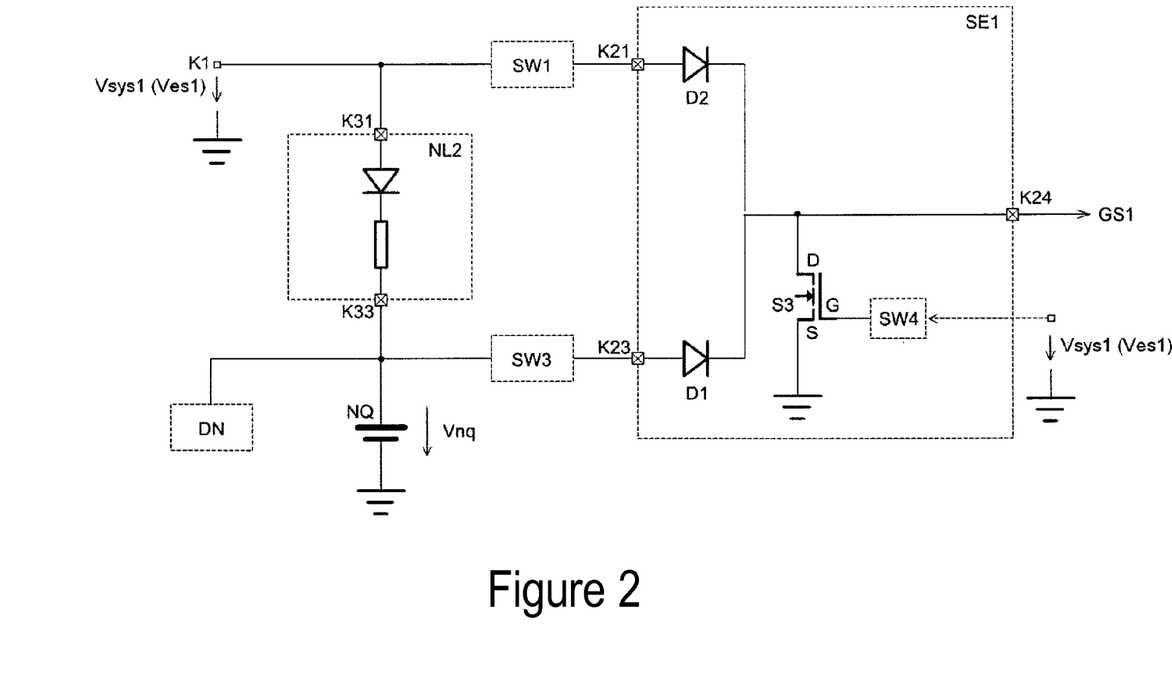
FIG. 2 shows a block diagram of the control arrangement of the first device according to the invention.

The device V of the first on-board system in FIGS. 1 and 2 further comprises two voltage conversion arrangements SW1, SW3, by means of which the device V generates the gate voltage Vgs1 from the system voltage Vsys1 of the first energy system Esys1 or from the voltage Ves1 of the first energy store ES1 and also from the voltage Vnq of the emergency power source NQ in order to control the first switch S1.

The two voltage conversion arrangements SW1, SW3 can both be formed as DC/DC convertors of the same type with conversion coefficients that can be adjusted manually and independently of one another, but also as DC/DC convertors of different types having different conversion coefficients.

The first MOSFET switch S1 is controlled by the control arrangement SE1, which provides, as an output signal at the output K24 of the arrangement SE1, the gate voltage Vgs1 for the switch S1. The control arrangement SE1 is electrically connected by means of two signal inputs K21, K23 to the respective output of the two voltage conversion arrangements SW1, SW3, which are in turn electrically connected on the input side to the respective positive connection of the first energy store Esys1 and the emergency power source NQ.

In the case of the two voltage conversion arrangements SW1, SW3, the voltage is converted as a percentage, that is to say the output voltage Ua is proportional to the input voltage Ue, wherein the ratios of the output voltages Ua to the respective input voltages Ue can be regulated in both voltage conversion arrangements SW1, SW3 by adjusting the adjustable conversion coefficients k.

The output voltages from the two voltage conversion arrangements SW1, SW3 are forwarded from the control arrangement SE1 to the gate connection GS1 of the first switch S1.

To this end, the control arrangement SE1 comprises two diodes D1, D2, which are electrically connected via their anode connection to the respective output of the voltage conversion arrangements SW3, SW1 and via their cathode connection to the gate connection GS1 of the first switch S1, and conduct and in the opposite direction block the current from the outputs of the respective voltage conversion arrangements SW3, SW1 to the gate connection GS1 of the first switch S1.

The control arrangement SE1 further comprises, between the nodes K24, that is to say between the gate connection of the first switch S1 and the ground potential, a third controllable switch S3, likewise designed as a self-locking MOSFET.

The gate connection of this third switch S3 is controlled by an intermediate control unit SH, wherein said control unit SH monitors the current flow in the on-board system (for example at the first switch S1) and, if the current flow rises sharply or if the current value in the on-board system (or at the first switch S1) is exceeded above a predefined target current value, closes the third switch S3 and thus connects the gate voltage Vgs1 of the first switch S1 to the ground potential. However, if the on-board system current lies below the target current value, the control unit SH holds the third switch S3 in an open state and holds the gate voltage Vgs1 of the first switch S1 at the voltage level of the output voltage of the voltage conversion arrangements SW1, SW3.

In a nominal fault-free system state in the on-board system, the system voltage Vsys1 of the first energy system ES1 or the voltage Ves1 at the first energy store ES1 is higher than or just as high as a minimum voltage (nominal voltage) necessary for a stable system state in the on-board system.

In this case, the output voltage from the first voltage conversion arrangement SW1, which is forwarded in an unchanged manner from the first diode D1 of the control arrangement SE1 to the gate connection GS1, is higher than the target gate voltage Vgs1 necessary to close the switch S1, and therefore the first switch S1 is closed or is held in the closed state and conducts the current from the first energy store ES1 to the system load LA.

Since, in this nominal system state, the current in the on-board system lies below the predefined target current value and the system voltage Vsys1 of the first energy system lies above a predefined target voltage value, the control unit SH opens the third switch S3 or holds the third switch S3 in an open state, such that the gate voltage Vgs1 of the first switch S1 is held at the voltage level of the output voltage of the voltage conversion arrangement SW1.

In this system state, the second control arrangement SE2 holds the second switch S2 in the open state.

In a non-nominal yet still fault-free system state in the on-board system, the current in the first energy system Esys1 rises steeply or the system voltage Vsys1 drops rapidly.

This change of the current or of the voltage is determined by the control unit SH in the control arrangement SE1. The control unit SH then sets its output voltage to a voltage level necessary to close the third switch S3 and thus closes the third switch S3.

Consequently, the gate connection GS1 of the first switch S1 is connected to the ground potential. As a result, the first switch S1 is opened and the current flow from the first energy store ES1 through said first switch S1 to the system load LA is interrupted.

At the same time, the second control arrangement SE2 closes the second switch S2 and thus connects the second energy system Esys2 or the second energy store ES2 to the first energy system Esys1 or to the first energy store ES1 and the system load LA. A current path from the first energy store ES1 via the second switch S2 to the second energy store ES2 and then to the system load LA is thus produced and the on-board-system voltage is held at a voltage potential necessary for operating the system load LA thanks to the second energy store ES2.

If a system fault occurs in the on-board system, for example as a result of voltage reversal of the first energy store ES1, the system voltage Vsys1 at the first energy system Esys1 or the voltage at the first energy store ES1 is thus interrupted in an uncontrolled manner, without a current rise being recorded in the on-board system during this process. In this case, the output voltage of the first voltage conversion arrangement SW1 falls below the target gate voltage Vgs.

As a result, there is a risk that the first switch S1 will open and that the current flow from the first energy store ES1 via said first switch S1 to the system load LA will be interrupted.

Since a rapidly rising current flow has not been determined however, the second control arrangement SE2 and the control unit SH of the first control arrangement SE1 do not close the second and third switches S2, S3.

In addition, because the control unit SH is supplied with power by the first energy store ES1, the control unit SH will no longer function in the event of an interruption of the system voltage at the first energy store ES1 due to the absent operating voltage. Consequently, the control voltage, that is to say the gate voltage, for the third switch S3 fails and automatically opens the third switch S3 formed as a self-locking MOSFET.

Due to the drop of the system voltage Vsys1, the operating voltage at the second control arrangement also ceases, therefore as does also the gate voltage for the second switch S2. The second switch S2 formed as a self-locking MOSFET thus opens automatically. This is desirable so that the second energy system Esys2 or the second energy store ES2 is not connected into the faulty on-board system.

A parasitic current injection Ii, which may flow in an uncontrolled manner through the MOSFET-internal parasitic diode path DS2 of the open second switch S2 and towards the second energy system Esys2 and may thus lead to overheating of the second switch S2 and also to uncontrolled overcharging of the second energy store ES2, is produced however in the faulty first energy system Esys1, for example at the generator G.

This current injection Ii can be easily dissipated to ground and made harmless with the aid of the current path through the closed first switch S1.

In the event of the absence of the voltage Ves1 in this faulty system state, the first switch S1 designed as a self-locking MOSFET still remains connected however to the gate connection of the first switch S1 thanks to the emergency power source NQ and the control path from the emergency power source via the second diode D3 in the control arrangement SE1, and thus bypasses the parasitic current injection Ii to ground.

This occurs since the emergency power source NQ supplies power independently of the system state and thanks to the downstream voltage conversion arrangement SW3, which converts or increases the voltage at the emergency power source NQ to a gate voltage necessary for closing the first switch S1, and the first switch S1 is closed or held in the closed state in a manner controlled by the voltage of the emergency power source NQ, even in the absence of the voltage from the first energy store ES1.

Since, when the system voltage of the first energy system ES1 or the voltage at the first energy store ES1 is interrupted, no voltage is applied to the gate connection of the third switch S3, the self-locking third switch S3 opens automatically and the gate connection of the first switch S1 is therefore also not short circuited to ground.

The first switch S1, in the event of an occurrence of a system fault in the first energy system Esys1, is thus closed or held in a closed state and the parasitic current injection Ii from the first energy system Esys1 is dissipated by said first switch S1 to ground and is made harmless.

As a result, it is possible to prevent a parasitic charging or overcharging process from the second energy store ES2 and a system overheating at the second switch S2 or within the device V. Furthermore, the entire on-board system can be held in a safety state (safe-state) in spite of the system fault.

The emergency power source NQ can be charged with power from the first energy system Esys1 or from the first energy store ES1 of the first energy system Esys1 in a nominal fault-free system state. The charging state of the emergency power source NQ or the charging process in the case of the emergency power source NQ can be monitored and regulated by the diagnosis arrangement DN.

Figure 3:
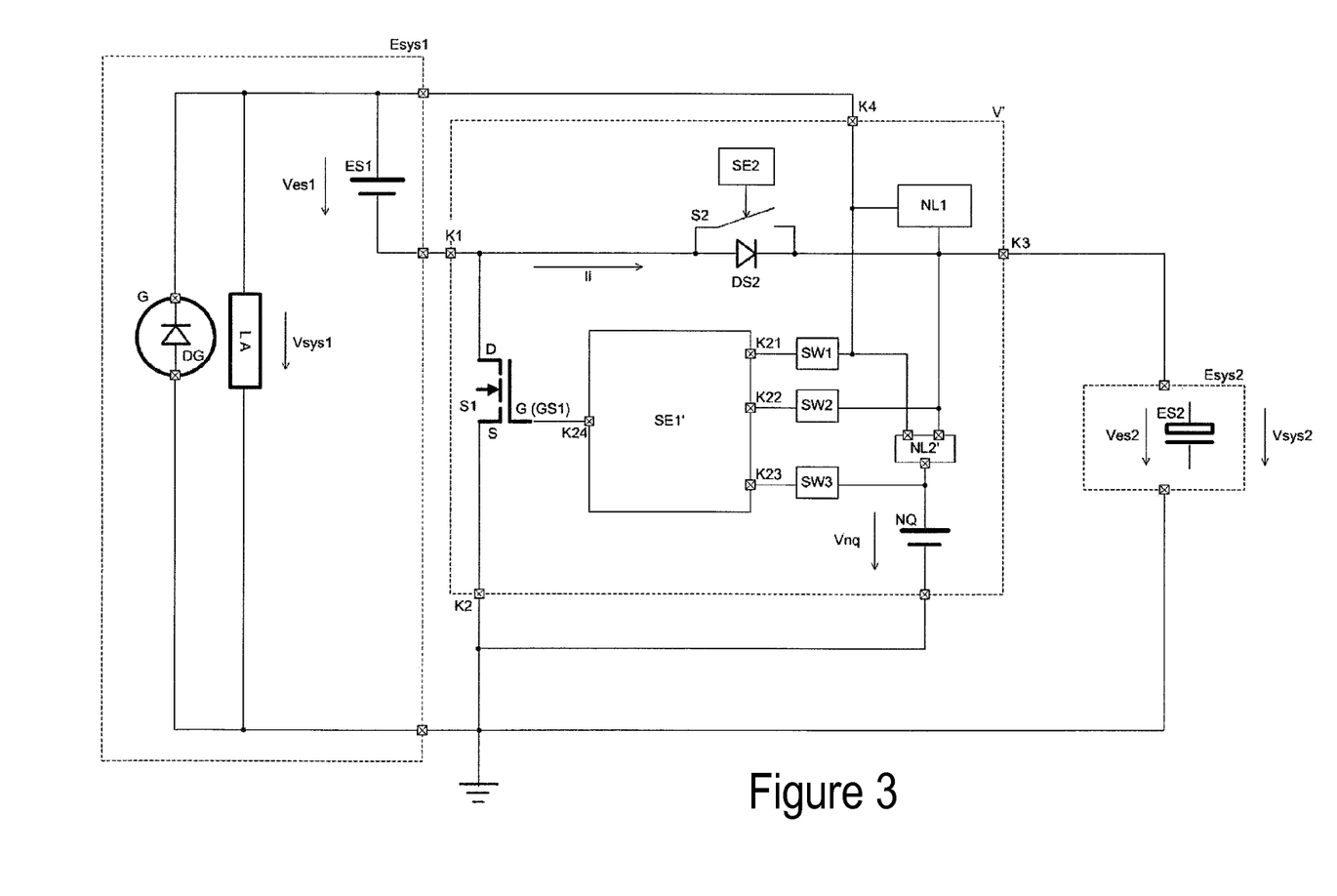
FIG. 3 shows a block diagram of an on-board system of a motor vehicle, comprising a second device according to the invention.
Figure 4:
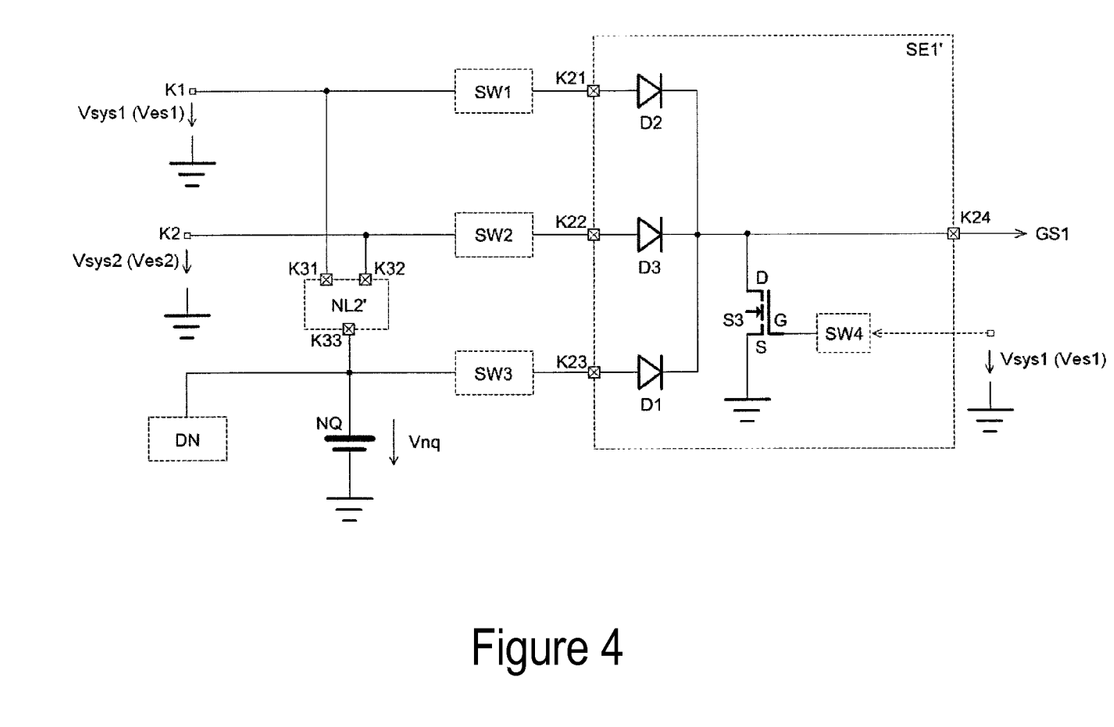
FIG. 4 shows a block diagram of the control arrangement of the second device according to the invention.
Figure 5:
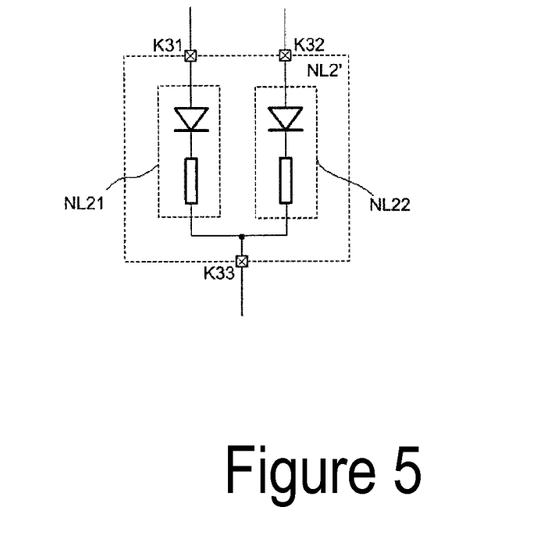
FIG. 5 shows a detailed block diagram of the recharging arrangement of the emergency power source of the second device according to the invention.

The device V' illustrated in FIGS. 3 to 5 differs from the device V illustrated in FIGS. 1 and 2 in that the first switch S1 is also controlled by the voltage Vsys2 of the second energy system Esys2 or by the voltage Ves2 of the second energy system ES2 besides by the voltage from the first energy store ES1 and the voltage from the emergency power source NQ.

To this end, the device V' comprises a further voltage conversion arrangement SW2, which converts the voltage Vsys2 of the second energy system Esys2 or the voltage Ves2 of the second energy store ES2 into a control voltage. This converted control voltage is forwarded from a further diode D3 to the gate connection GS1 of the first switch S1 and controls the first switch S1 as a gate voltage Vgs1.

A redundant control path for the first switch S1 is thus created, which, in the faulty state in the first energy system Esys1, is also used besides the control path from the emergency power source NQ to close the first switch S1 or to hold the first switch S1 in the closed state.

In this case, the emergency power source NQ can be charged with power both from the first and from the second energy store ES1, ES2. To this end, the recharging arrangement NL2' comprises a connection K31, K32 to the respective energy store ES1, ES2. Between the respective input connection K31, K32 and the output connection K33, the recharging arrangement NL2' comprises in each case a diode and a recharging unit comprising a resistor.

LIST OF REFERENCE SIGNS

| | |
|---|---|
| Esys1, Esys2 | first, second energy system |
| ES1, ES2 | first, second energy store |
| V, V' | device according to the invention |
| G | generator |
| DG | parasitic diode in the generator |
| LA | system load |
| S1, S2, S3 | first, second, third switch |
| DS2 | parasitic diode path in the second switch S2 |
| NQ | emergency power source |
| NL1, NL2, NL2' | recharging arrangement |
| DN | diagnosis arrangement |
| SW1, SW2, SW3, SW4 | voltage conversion arrangement |
| SE1, SE2 | control arrangement |
| SH | control unit |
| D1, D2, D3 | diode, electric valve |
| K1, K2, K3, K4 | connection of the device V, V' |
| K21, K22, K23, K24 | connection of the control arrangement SE1 |
| K31, K32, K33 | connection of the recharging arrangement NL2' |
| GS1 | gate connection of the first switch S1 |

What is claimed is:

1. An on-board system for a vehicle, the on-board system comprising:
    a first current path comprising:
        at least one current consumer,
        a first energy store, and
        a first self-locking switch controllable by a first control voltage,
        wherein, in a closed state of the first switch, the at least one current consumer is electrically connectable to the first energy store,
    a second current path comprising:
        the at least one current consumer,
        the first and a second energy store, and
        a second switch controllable by a second control voltage, wherein, in a closed state of the second switch, the at least one current consumer is electrically connectable to the first and the second energy store, and a control arrangement configured to close the first switch or to hold the first switch in the closed state when the voltage provided by the energy store supplying the first switch falls below a minimum voltage threshold value necessary to close the first switch or hold the first switch in the closed state.

2. The on-board system of claim 1, comprising an emergency power source configured to provide the voltage necessary to close the first switch or to hold the first switch in the closed state, wherein the control arrangement is configured to close the first switch or holds the first switch in the closed state by the voltage provided by the emergency power source.

3. The on-board system of claim 2, wherein the control arrangement is configured to close the first switch or hold the first switch in the closed state selectively by the voltage of the emergency power source or by the voltage of the first energy store or of the second energy store and in a manner dependent on (a) the voltage of the emergency power source and (b) at least one of the voltages of the first energy store and of the second energy store.

4. The on-board system of claim 2, wherein:
the emergency power source is a rechargeable accumulator, and
the on-board system comprises, between the emergency power source and at least one of the first energy store and the second energy store, at least one of a first recharging unit and a second recharging unit configured to charge the emergency power source with the power of at least one of the first energy store and the second energy store.

5. The on-board system of claim 1, wherein the first energy store and the second energy store are only electrically connected at the same time to the current consumer when the first switch is in the open state and the second switch is simultaneously in the closed state.

6. The on-board system of claim 1, wherein the control arrangement closes the first switch or holds the first switch in the closed state by the voltage provided by the emergency power source only when the second switch is in the open state.

7. The on-board system of claim 1, wherein:
the first switch comprises a control connection for the control voltage, and
the control arrangement comprises at least one of:
a first diode arranged between the control connection of the first switch and the emergency power source, and conductive towards the control connection of the first switch and in the opposite direction blocking,
a second diode arranged between the control connection of the first switch and the first energy store, and conductive towards the control connection of the first switch and in the opposite direction blocking, and
a third diode arranged between the control connection, of the first switch and the second energy store, and conductive towards the control connection of the first switch and in the opposite direction blocking.

8. The on-board system of claim 1,
wherein the control arrangement comprises:
a third controllable switch between the control connection of the first switch and the ground potential, and
a control unit configured to control the third switch, and wherein said control unit is configured to:
determine an effective current value at the current path from the first energy store to the current consumer,
compare the effectively determined current value with a predefined target current value, and
if the effectively determined current value exceeds the target current value, close the third switch and thus connect the control voltage of the first switch to ground potential.

9. A device for controlling a current flow in an on-board system, said device comprising:
a first electrical connection, a second electrical connection, and a third electrical connection,
a first self-locking switch arranged between the first and the second connection and controllable by a first control voltage applied to a fourth connection of the device, wherein, in a closed state of the first switch, the first connection is electrically connectable to the second connection,
a second switch arranged between the first and the third connection and controllable by a second control voltage, wherein, in a closed state of the second switch, the first connection is electrically connectable to the third connection,
a control arrangement configured to close the first switch or to hold the first switch in the closed state when the control voltage applied to the fourth connection of the device falls below a minimum voltage threshold value necessary to close the first switch or to hold the first switch in the closed state, and
an emergency power source configured to provide the voltage necessary to the control arrangement for closing the first switch or for holding the first switch in the closed state,
wherein the first switch, in the closed state controlled by the control arrangement, electrically connects the first connection to the second connection and thus prevents a potential parasitic current flow from the first connection via the open second switch to the third connection.

10. The device of claim 9, wherein the control arrangement is configured to close the first switch or hold the first switch in the closed state selectively by the voltage of the emergency power source or by the control voltage applied to the fourth connection or to the third connection of the device, in a manner dependent on the voltage of the emergency power source and dependent on the control voltage applied to the fourth connection or to the third connection of the device.

11. The device of claim 9, wherein:
the first switch comprises a control connection for the control voltage,
the control arrangement comprises at least one of:
a first electric valve, in particular a diode, arranged between the control connection of the first switch and the emergency power source, and conductive towards the control connection of the first switch and in the opposite direction blocking,
a second electric valve, in particular a diode, arranged between the control connection of the first switch and the fourth connection, and conductive towards the control connection of the first switch and in the opposite direction blocking, and
a third electric valve, in particular a diode, arranged between the control connection of the first switch and the third connection, and conductive towards the control connection of the first switch and in the opposite direction blocking.

12. The device of claim 9, wherein:
the emergency power source is a rechargeable accumulator, and
the device, between the emergency power source and at least one of the fourth connection and third connection, comprises at least one of a first recharging unit and a second recharging unit configured to charge the emergency power source with the power applied to at least one of the fourth connection and the third connection.

13. The device of claim 9,
wherein the control arrangement comprises:
   a third controllable switch between the control connection of the first switch and the ground potential,
   a control unit configured to control the third switch, and
wherein said control unit is configured to:
   determine an effective current value at the current path from the first connection to the second connection,
   compare the effectively determined current value with a predefined target current value, and,
   if the effectively determined current value exceeds the target current value, close the third switch and thus connect the control voltage of the first switch to ground potential.

14. A motor vehicle comprising:
an on-board system comprising:
   a first current path comprising:
     at least one current consumer,
     a first energy store, and
     a first self-locking switch controllable by a first control voltage,
     wherein, in a closed state of the first switch, the at least one current consumer is electrically connectable to the first energy store,
   a second current path comprising:
     the at least one current consumer,
     the first and a second energy store, and
     a second switch controllable by a second control voltage,
     wherein, in a closed state of the second switch, the at least one current consumer is electrically connectable to the first and the second energy store, and
   a control arrangement configured to close the first switch or to hold the first switch in the closed state when the voltage provided by the energy store supplying the first switch falls below a minimum voltage threshold value necessary to close the first switch or hold the first switch in the closed state.

* * * * *